(12) United States Patent
Lim et al.

(10) Patent No.: US 11,458,764 B2
(45) Date of Patent: Oct. 4, 2022

(54) WHEEL BEARING HAVING IMPROVED SENSOR TARGET AND SENSOR TARGET MOUNTING PORTION

(71) Applicant: ILJIN GLOBAL Co., Ltd, Seoul (KR)

(72) Inventors: Jong Keun Lim, Seoul (KR); Il Hwan Lee, Seoul (KR); In Jae Kim, Seoul (KR); In Woo Baek, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 4 days.

(21) Appl. No.: 17/209,855

(22) Filed: Mar. 23, 2021

(65) Prior Publication Data
US 2022/0194123 A1    Jun. 23, 2022

(30) Foreign Application Priority Data
Dec. 21, 2020   (KR) .................. 10-2020-0180339

(51) Int. Cl.
*F16C 41/00*    (2006.01)
*B60B 27/00*    (2006.01)

(52) U.S. Cl.
CPC ........ *B60B 27/0068* (2013.01); *F16C 41/007* (2013.01); *F16C 2233/00* (2013.01); *F16C 2326/02* (2013.01)

(58) Field of Classification Search
CPC .......... F16C 41/007; F16C 19/184–187; F16C 2233/00; F16C 2326/02; B60B 27/001; B60B 27/0068
See application file for complete search history.

(56) References Cited

U.S. PATENT DOCUMENTS

| | | | |
|---|---|---|---|
| 5,127,747 A * | 7/1992 | Hilby | G01P 3/443 310/168 |
| 9,534,635 B2 * | 1/2017 | Norimatsu | B60B 27/00 |
| 11,318,784 B2 * | 5/2022 | Morello | F16C 19/184 |
| 2019/0126676 A1 * | 5/2019 | Hubert | B60T 8/329 |
| 2022/0025932 A1 * | 1/2022 | Lee | B60B 27/00 |

* cited by examiner

*Primary Examiner* — Alan B Waits
(74) *Attorney, Agent, or Firm* — Dinsmore & Shohl LLP; Yongsok Choi, Esq.

(57) ABSTRACT

A wheel bearing includes a rotating element to which the wheel of the vehicle is mounted and configured to rotate together with the wheel of the vehicle; a non-rotating element fixed to the vehicle body; and one or more rolling elements provided between the rotating element and the non-rotating element and configured to rotatably support the rotating element relative to the non-rotating element. The rotating element includes a wheel mounting flange, and a sensor target used to measure a rotational speed of the wheel is provided on an axial end surface of the wheel mounting flange. The sensor target includes an annular plate portion configured to be mounted to the axial end surface of the wheel mounting flange, and the annular plate portion includes a target portion used for measuring the rotational speed of the wheel and at least one bolt insertion hole.

16 Claims, 12 Drawing Sheets

PRIOR ART

PRIOR ART

WHEEL BEARING HAVING IMPROVED SENSOR TARGET AND SENSOR TARGET MOUNTING PORTION

CROSS-REFERENCE TO RELATED APPLICATION

This application claims priority to Korean Patent Application No. 10-2020-0180339 filed on Dec. 21, 2020, the entire contents of which are herein incorporated by reference.

TECHNICAL FIELD

The present disclosure relates to a wheel bearing used to support a wheel of a vehicle while rotatably mounting the wheel to a vehicle body, more particularly, to a wheel bearing configured such that a rotational speed of the wheel can be more easily measured by improving a sensor target for measuring the rotational speed of the wheel and a structure of a mounting portion to which the sensor target is mounted.

BACKGROUND ART

A bearing is a part that rotatably supports a rotating element relative to a non-rotating element in a rotating device. A wheel bearing is used to support a wheel of a vehicle while rotatably mounting the wheel to a vehicle body.

As shown in FIGS. 1 and 2, such a wheel bearing is typically configured such that a rotating element (for example, a wheel hub 10 and an inner ring 20) to which a wheel of a vehicle is mounted is coupled to a non-rotating element (for example, an outer ring 30) fixed to a vehicle body through rolling elements 40 so as to rotatably support the wheel mounted to the rotating element 10 relative to the vehicle body.

In the meantime, the wheel bearing may comprise a wheel speed sensor (WSS) that measures a rotational speed of a wheel and may be configured to operate a controller such as an anti-lock brake system (ABS) based on rotational speed information measured by the wheel speed sensor.

Typically, the wheel speed sensor is disposed adjacent to a sensor target (for example, a tonewheel, an encoder, or the like) mounted to the rotating element of the wheel bearing so as to sense a change in magnetic field generated by rotation of the sensor target and measure the rotational speed of the wheel.

For example, a wheel speed sensor 60 is disposed adjacent to a sensor target 50 mounted at a middle portion of the rotating element so as to measure the rotational speed of the wheel as shown in FIG. 1, or is disposed adjacent to a sensor target 50 mounted on one-side end portion (for example, vehicle-body-side end portion) of the rotating element so as to measure the rotational speed of the wheel as shown in FIG. 2.

However, it may be difficult to mount the wheel speed sensor with the above-described structure depending on a vehicle structure. As an example, in a vehicle having an axle tube type of power transmission structure, such as a RR (rear-engine rear driven) type of truck, assembly is made in a state in which a vehicle shaft is inserted into a tube housing. This makes it difficult to secure a structural space, in which the sensor target and/or a sensing member is mounted, around the rotating element of the wheel bearing.

As a result, it may be difficult to utilize the conventional wheel speed measurement structure shown in FIGS. 1 and 2. For this reason, a third-generation wheel bearing structure, which has been widely used in recent years, may not be applied to the vehicle having an axle tube type of power transmission structure, and these vehicles have been manufactured through the application of a first-generation wheel bearing structure.

SUMMARY

Technical Problem

The present disclosure is made in view of the above problems, and an object of the present disclosure is to enhance a design freedom of a wheel bearing provided with a wheel speed sensor and further to enhance the productivity and operational reliability of the wheel speed sensor and the wheel bearing provided with the wheel speed sensor by improving a sensor target for measuring a rotational speed of a wheel and a structure of a mounting portion to which the sensor target is mounted.

Technical Solution

Representative configurations of the present disclosure for achieving the above object are as follows.

According to one embodiment of the present disclosure, a wheel bearing that supports a wheel of a vehicle relative to a vehicle body while rotatably mounting the wheel to the vehicle body may be provided. The wheel bearing according to one embodiment of the present disclosure may comprise: a rotating element to which the wheel of the vehicle is mounted and configured to rotate together with the wheel of the vehicle; a non-rotating element fixed to the vehicle body; and one or more rolling elements provided between the rotating element and the non-rotating element and configured to rotatably support the rotating element relative to the non-rotating element. According to one embodiment of the present disclosure, the rotating element may comprise a wheel mounting flange on which the wheel of the vehicle is mounted, and a sensor target used to measure a rotational speed of the wheel may be provided on an axial end surface of the wheel mounting flange. According to one embodiment of the present disclosure, the sensor target may comprise an annular plate portion configured to be mounted to the axial end surface of the wheel mounting flange, the annular plate portion may comprise a target portion used for measuring the rotational speed of the wheel and at least one bolt insertion hole into which a wheel mounting bolt is inserted, and at least one blank portion having a penetrated structure may be provided between the target portion and the bolt insertion hole in a radial direction.

According to one embodiment of the present disclosure, the blank portion may be configured to be in communication with the bolt insertion hole.

According to one embodiment of the present disclosure, the blank portion may comprise: a central blank positioned outside the bolt insertion hole in the radial direction; and at least one side blank formed to extend in a circumferential direction from the central blank.

According to one embodiment of the present disclosure, the bolt insertion hole may be configured to be in communication with the central blank of the blank portion.

According to one embodiment of the present disclosure, the side blank may have an extended portion whose radial gap becomes larger as it is more distant from the center blank in the circumferential direction.

According to one embodiment of the present disclosure, the sensor target may further comprise a cylindrical portion formed to extend along an axial direction from a radially inner end portion of the annular plate portion.

According to one embodiment of the present disclosure, the cylindrical portion of the sensor target may be configured to entirely or partially cover an axial gap defined between the wheel mounting flange and the non-rotating element of the wheel bearing from a radially outward direction.

According to one embodiment of the present disclosure, the target portion may comprise a plurality of penetrated windows provided at equal intervals along the circumferential direction.

According to another embodiment of the present disclosure, a wheel bearing that supports a wheel of a vehicle relative to a vehicle body while rotatably mounting the wheel to the vehicle body may be provided. The wheel bearing according to one embodiment of the present disclosure may comprise: a rotating element to which the wheel of the vehicle is mounted and configured to rotate together with the wheel of the vehicle; a non-rotating element fixed to the vehicle body; and one or more rolling bodies provided between the rotating element and the non-rotating element and configured to rotatably support the rotating element relative to the non-rotating element. According to one embodiment of the present disclosure, the rotating element may comprise a wheel mounting flange on which the wheel of the vehicle is mounted, a sensor target used to measure a rotational speed of the wheel may be provided on an axial end surface of the wheel mounting flange. According to one embodiment of the present disclosure, the sensor target may comprise an annular plate portion configured to be mounted to the axial end surface of the wheel mounting flange; and a cylindrical portion formed to extend along the axial direction from a radially inner end portion of the annular plate portion. According to one embodiment of the present disclosure, the annular plate portion of the sensor target may comprise at least one bolt insertion hole into which a wheel mounting bolt is inserted, the cylindrical portion of the sensor target may comprise a target portion used for measuring the rotational speed of the wheel, and at least one blank portion having a penetrated structure may be provided between the bolt insertion hole and the target portion.

According to one embodiment of the present disclosure, the blank portion may be provided in the cylindrical portion of the sensor target.

According to one embodiment of the present disclosure, at least one baffle portion formed to be bent outward in the radial direction may be provided in a connection portion between the annular plate portion and the cylindrical portion of the sensor target.

According to one embodiment of the present disclosure, a radially inner portion of the sensor target and a drain hole formed in the wheel mounting flange may be in communication with each other through the baffle portion.

According to one embodiment of the present disclosure, the target portion may comprise a plurality of penetrated windows provided to be spaced at equal intervals along a circumferential direction.

According to one embodiment of the present disclosure, the wheel bearing may further comprise a coupling member to be coupled to the cylindrical portion of the sensor target, and the coupling member may be configured to cover a radially inner portion of the window provided in the target portion.

According to one embodiment of the present disclosure, the coupling member may be configured to entirely or partially fill the window provided in the target portion by being inserted into the window.

According to one embodiment of the present disclosure, the rotating element of the wheel bearing may comprise a wheel hub to which the wheel is mounted; at least one inner ring mounted to the wheel hub in a press-fitting manner, the non-rotating element of the wheel bearing may be an outer ring coupled to a chassis component of the vehicle, and the wheel mounting flange may be provided in the wheel hub.

Further, the wheel bearing according to the present disclosure may further comprise other additional configurations without departing from the technical sprit of the present disclosure.

Advantageous Effects

A wheel bearing according to one embodiment of the present disclosure is configured such that a sensor target used for measuring a rotational speed of a wheel is mounted to a wheel mounting flange of a rotating element. This makes it possible to easily mount the sensor target and a sensing member to a wheel bearing of a vehicle having an axle tube type of power transmission structure or the like. Thus, it is also possible to easily apply a third-generation wheel bearing structure to the vehicle having an axle tube type of power transmission structure.

Further, a wheel bearing according to one embodiment of the present disclosure is configured such that a sensor target used for measuring a rotational speed of a wheel is mounted to a wheel mounting flange via wheel mounting bolts. Thus, it is possible to easily mount the sensor target to the wheel bearing without an additional mounting structure or an additional mounting process, thereby improving the productivity of the wheel bearing and reducing the manufacturing cost of the wheel bearing.

Further, a wheel bearing according to one embodiment of the present disclosure is configured such that at least one blank portion having a penetrated structure is provided between a bolt insertion hole and a target portion of a sensor target. Thus, it is possible to prevent the target portion from being deformed due to a fastening force of a wheel mounting bolt, which is generated when mounting the sensor target to a wheel mounting flange with the wheel mounting bolt. This may prevent the sensing accuracy from degrading due to such a deformation of the target portion.

DETAILED DESCRIPTION

Figure 1:
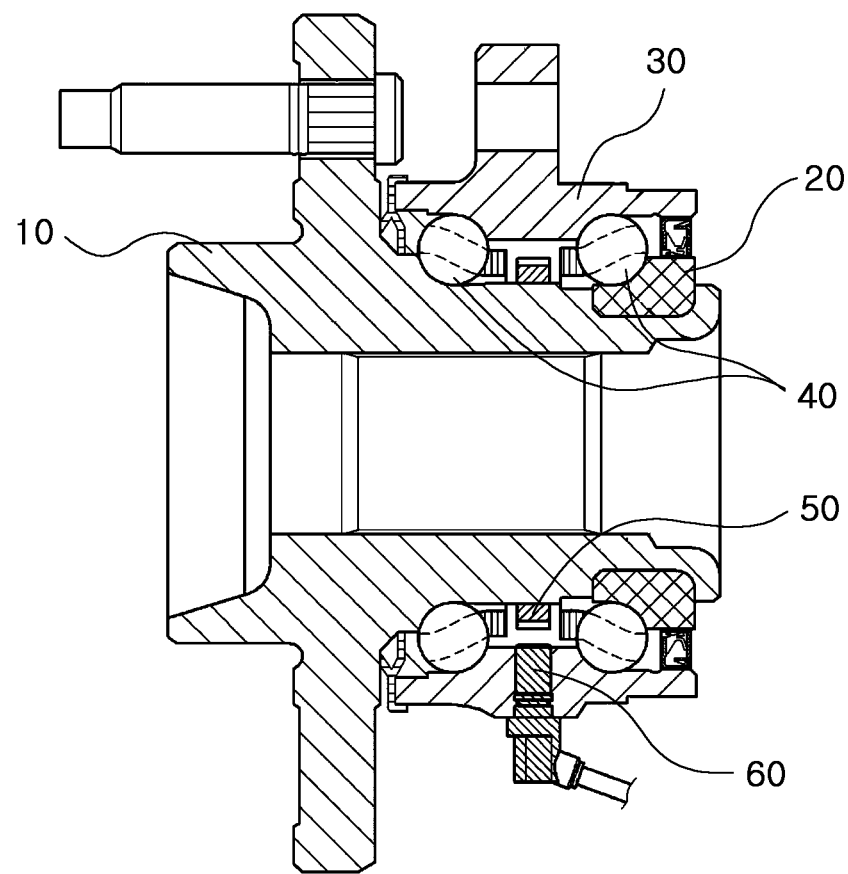
FIG. 1 exemplarily illustrates a conventional wheel bearing having a wheel speed sensor.
Figure 2:
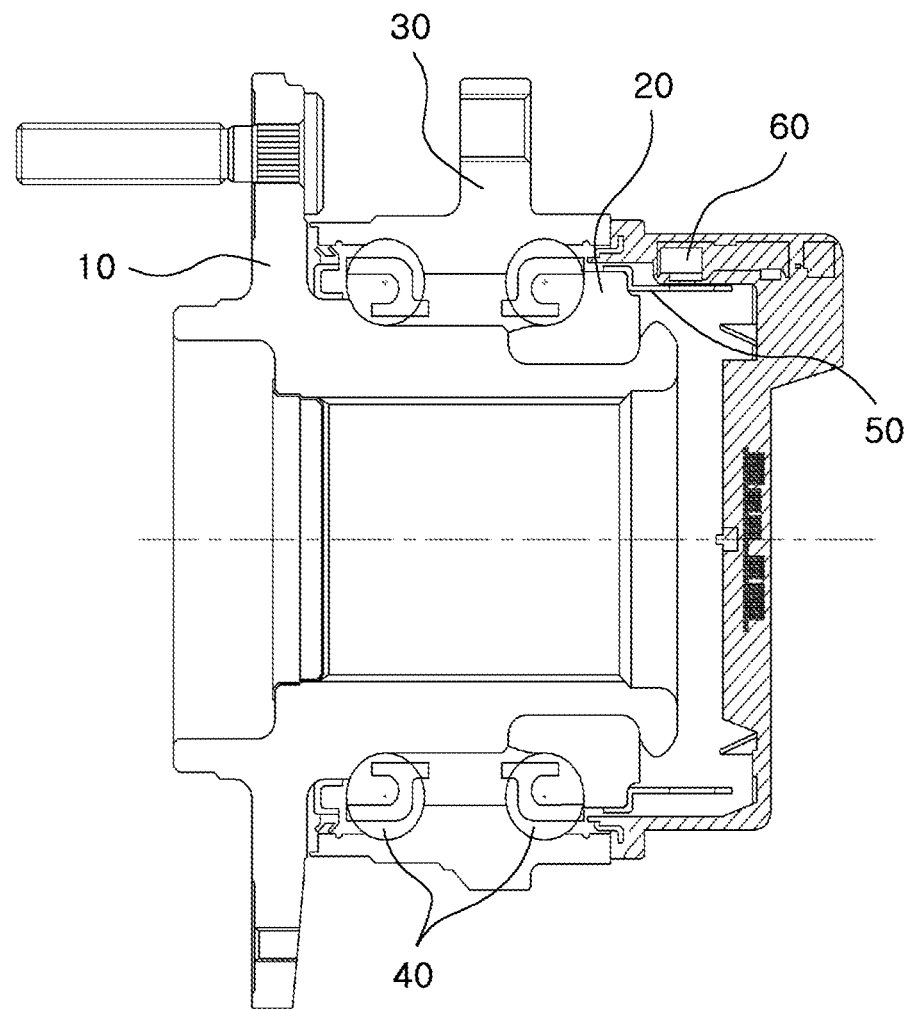
FIG. 2 exemplarily illustrates a conventional wheel bearing having a wheel speed sensor.
Figure 3:
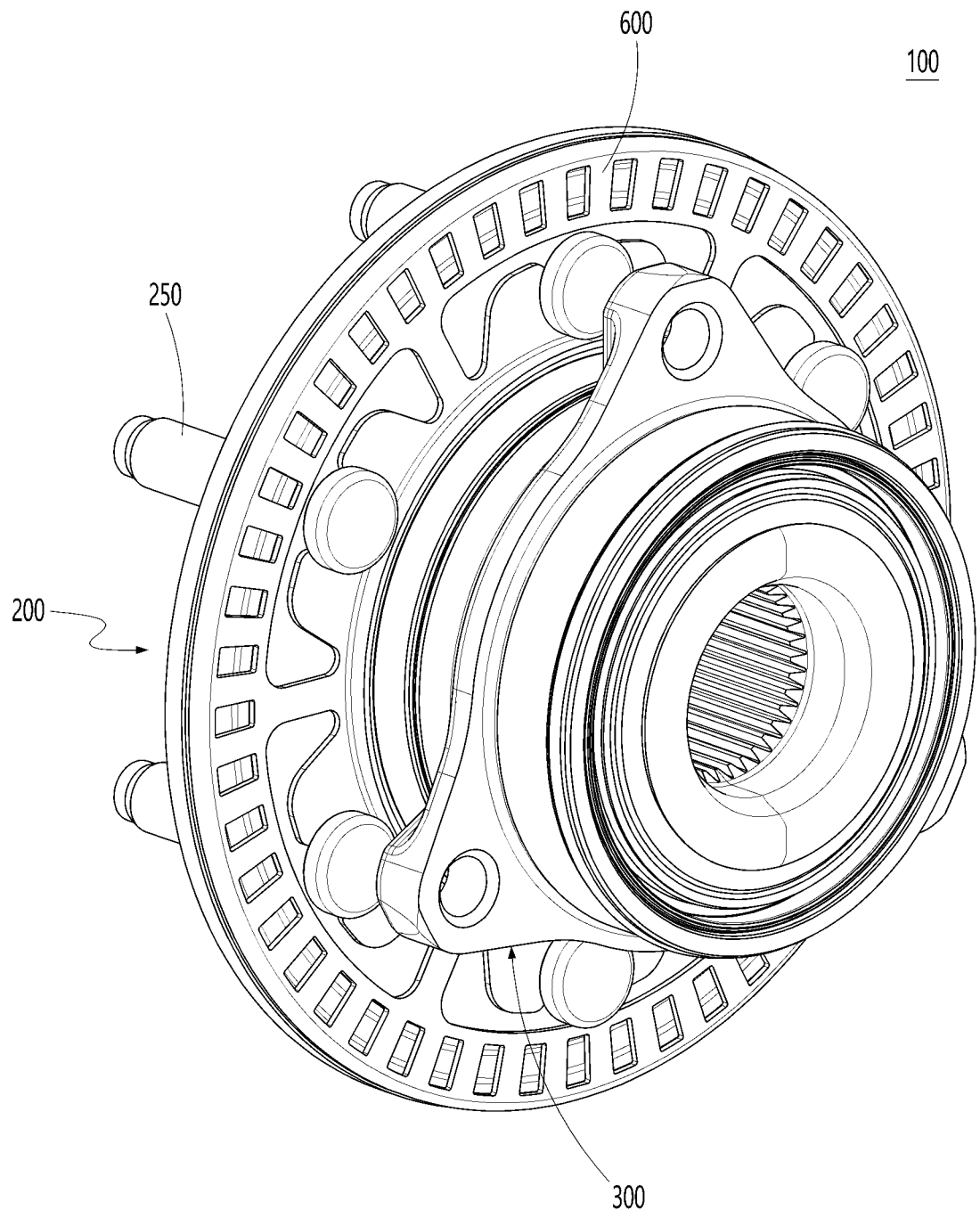
FIG. 3 exemplarily illustrates an overall structure of a wheel bearing according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions on these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising", "including", "having" and the like used herein should be construed as open-ended terms encompassing the possibility of including other embodiments.

In the present specification, the term "axial direction" refers to a direction extending along a rotational central axis of a wheel bearing, the term "radial direction" refers to a direction away from the rotational central axis or a direction approaching the rotational central axis perpendicularly with respect to the axial direction, and the term "circumferential direction" refers to a direction in which a component rotates around the above-described axial direction.

The singular form described herein may include the plural form unless the context clearly dictates otherwise, and this is equally applied to the singular form set forth in the claims.

In the present specification, when a component is referred to as being "positioned" or "formed" in (or on, at, etc.) one side of another component, the component may be directly positioned or formed in (or on, at, etc.) the one side of another component in a direct contact manner, or may be positioned or formed in (or on, at, etc.) the one side of another component by intervening yet another component therebetween.

Hereinafter, preferred embodiments of the present disclosure will be described in detail with reference to the appended drawings to such an extent that the present disclosure can be readily practiced by one of ordinary skill in the art. In the accompanying drawings, the same reference numerals will be assigned to the same or corresponding components. Further, in the following descriptions of the embodiments, duplicate descriptions of the same or corresponding components will be omitted. However, even though a description of a component is omitted, such a component is not intended to be excluded in any embodiment.

Referring to FIGS. 3 to 6, there are exemplarily shown a wheel bearing 100 according to one embodiment of the present disclosure. As shown in the drawings, the wheel bearing 100 according to one embodiment of the present disclosure may be formed similar to a conventional wheel bearing in an overall configuration. For example, the wheel bearing 100 according to one embodiment of the present disclosure may be configured such that a rotating element 200 to which a wheel is mounted is rotatably supported on a non-rotating element 300 connected to a vehicle body through a plurality of rolling elements 400, like a conventional wheel bearing.

According to one embodiment of the present disclosure, the rotating element 200 may be configured to comprise a wheel hub 210 to which the wheel is mounted and one or more inner rings 220 mounted to the wheel hub 210 in a press-fitting manner. The non-rotating element 300 may be an outer ring that is coupled to a chassis component of the vehicle and fixed to the vehicle body.

However, the wheel bearing 100 according to one embodiment of the present disclosure is not limited to the above-described configuration, but may be modified in other various configurations that are applicable to the conventional wheel bearing.

According to one embodiment of the present disclosure, the wheel hub 210 constituting the rotating element 200 may be formed in a generally cylindrical shape extending along the axial direction. A wheel mounting flange 230 (hub flange) is provided near a wheel-side end portion of the wheel hub 210, and wheel mounting bolts 250 (for example, hub bolt) are fasten to bolt mounting holes 240 formed in the wheel mounting flange 230 so that the wheel of the vehicle is mounted to the wheel mounting flange 230. On the other hand, a stepped portion 260 may be formed on a vehicle-body-side end portion of the wheel hub 210 such that the inner ring 220 is mounted on the stepped portion 260. A raceway (inner raceway) may be formed on a portion of an outer peripheral surface of the wheel hub 210 to support the rolling elements 400 at the radially inward direction.

Figure 4:
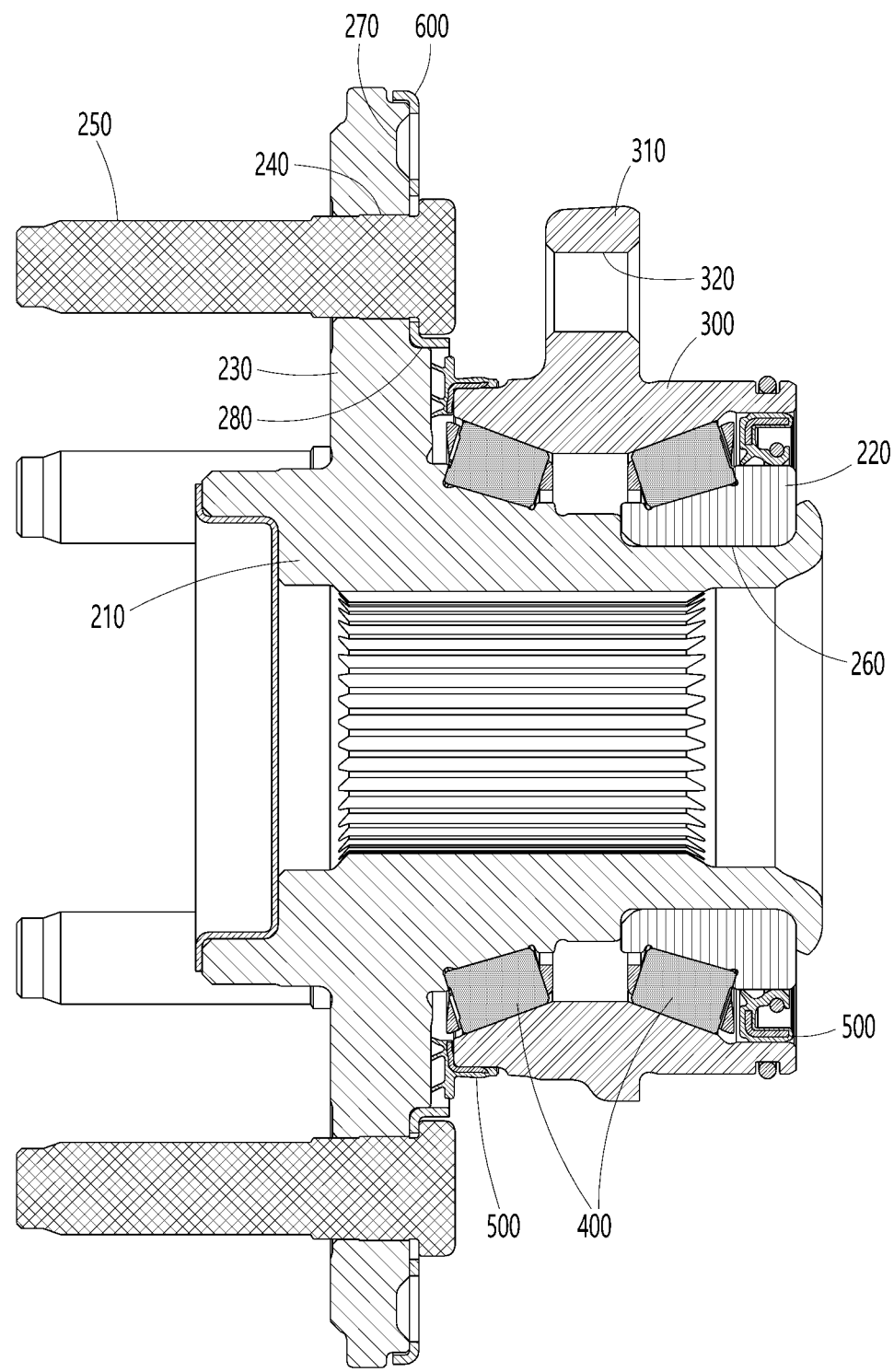
FIG. 4 exemplarily illustrates a cross-sectional structure of the wheel bearing shown in FIG. 3.
Figure 5:
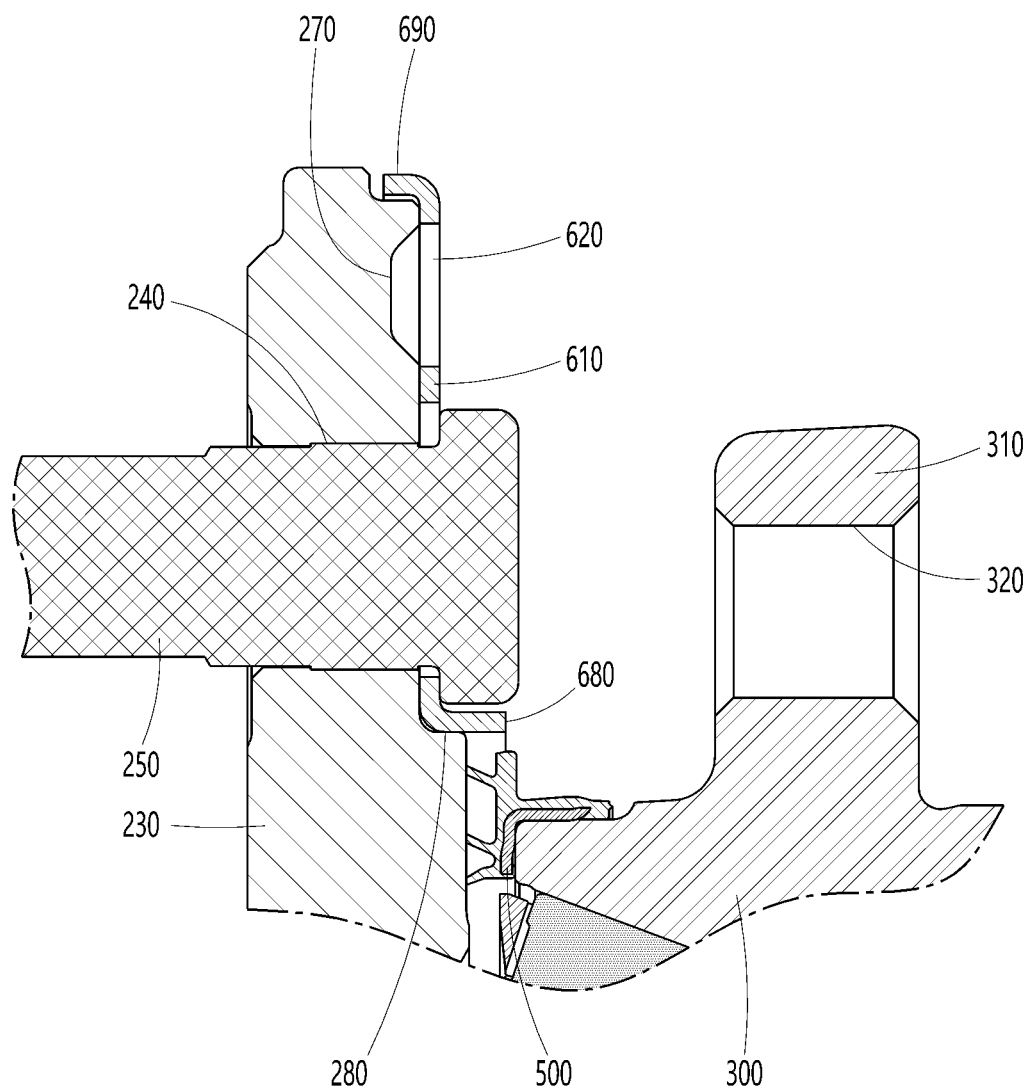
FIG. 5 is an enlarged view illustrating a structure of a sensor target mounting portion in the wheel bearing shown in FIG. 3.
Figure 6:
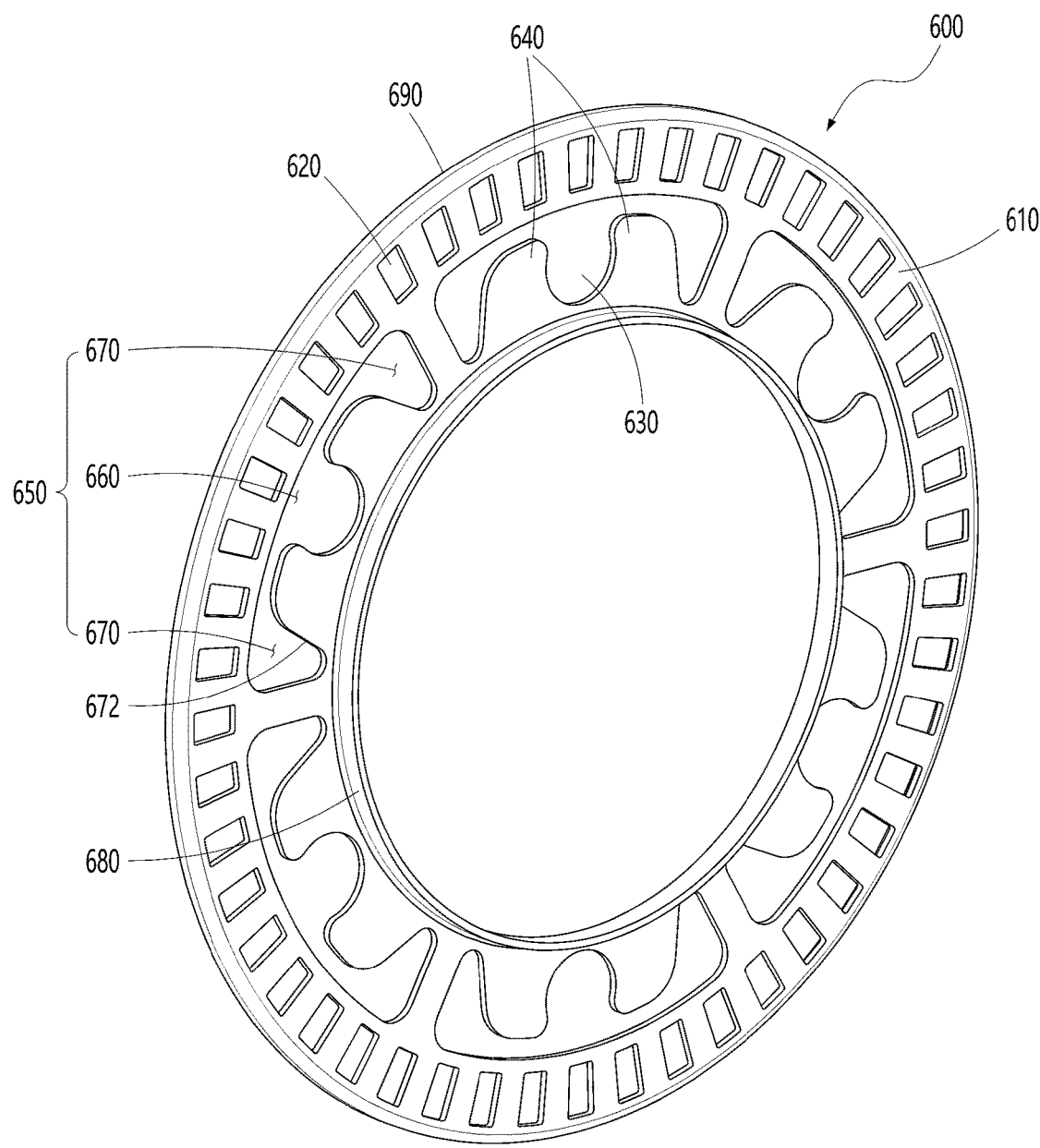
FIG. 6 exemplarily illustrates a structure of a sensor target mounted to the wheel bearing so as to measure a rotational speed of a wheel in the wheel bearing shown in FIG. 3.

According to one embodiment of the present disclosure, the inner ring 220 may be mounted to one side of the wheel hub 210 in a press-fitting manner. For example, the inner ring 220 may be mounted and held on the wheel hub 210 by plastically deforming the vehicle-body-side end portion of the wheel hub 210 as shown in FIG. 4 or by fastening nuts or the like to the vehicle-body-side end portion of the wheel hub 210, in a state in which the inner ring 220 is pressed into the stepped portion 260 formed in the vehicle-body-side end portion of the wheel hub 210. Further, a raceway (inner raceway) with which the rolling elements 400 are brought into contact may be formed on the outer peripheral surface of the inner ring 220 to support the rolling elements 400 at the radially inward direction.

In the embodiment shown in the drawings, the wheel bearing is configured such that one raceway for supporting the rolling elements is directly formed on the outer peripheral surface of the wheel hub. However, the wheel bearing according to one embodiment of the present disclosure is not limited to such a configuration. That is, the wheel bearing according to one embodiment of the present disclosure may be modified in various forms. For example, the wheel bearing according to one embodiment of the present disclosure may be configured such that two inner rings are mounted to the wheel hub and raceways for supporting the rolling bodies are formed by the two inner rings.

According to one embodiment of the present disclosure, the outer ring constituting the non-rotating element 300 may comprise a vehicle-body-side mounting flange 310 formed on an outer peripheral surface thereof to mount the wheel bearing 100 to the vehicle body, and may be fixed to a vehicle-body-side member by engaging fastening members into fastening holes 320 formed in the vehicle-body-side mounting flange 310. The outer ring may have raceway (outer raceway) formed on an inner peripheral surface thereof to bring into contact with the rolling elements 400. The raceway formed on the inner peripheral surface of the non-rotating element (outer ring) may be configured to accommodate and support the rolling elements 400 as rolling members in cooperation with the raceways formed on the rotating element (the wheel hub and/or the inner ring).

According to one embodiment of the present disclosure, the rolling elements 400 may be arranged between the rotating element 200 and the non-rotating element 300 to perform a function of rotatably supporting the wheel mounted to the rotating element 200 relative to the vehicle body to which the non-rotating element 300 is coupled.

According to one embodiment of the present disclosure, a sealing member 500 may be provided in one-side end portion or both-side end portions of the wheel bearing so as to prevent external foreign substances from flowing into a bearing space portion in which the rolling elements 400 are placed or prevent lubricant filled in the bearing space portion from leaking outward.

According to one embodiment of the present disclosure, a sensor target 600 used to measure a rotational speed of the wheel may be provided on one axial end surface (for example, vehicle-body-side end surface) of the wheel mounting flange 230 provided on the rotating element 200.

According to one embodiment of the present disclosure, the sensor target 600 may comprise an annular plate portion 610 of a thin plate shape. The annular plate portion 610 may be in surface-contact with the one axial end surface (for example, vehicle-body-side end surface) of the wheel mounting flange 230.

According to one embodiment of the present disclosure, the annular plate portion 610 of the sensor target 600 may be provided with a target portion 620 that is used in measuring the rotational speed of the wheel. For example, the target portion 620 may be formed to have a structure in which a plurality of penetrated windows are provided at equal intervals along the circumferential direction.

In this configuration, as the sensor target 600 rotates together with the wheel, a change in magnetic field occurs by the target portion 620. Such a change in magnetic field may be sensed by a sensing member (not shown). Accordingly, the rotational speed of the wheel can be measured.

According to one embodiment of the present disclosure, each of the plurality of penetrated windows constituting the target portion 620 may be preferably formed to have a width and height of 1 mm or more for more accurately measuring the rotational speed.

According to one embodiment of the present disclosure, the sensor target 600 may have at least one bolt insertion hole 630 formed at the position corresponding to the bolt mounting hole 240 of the wheel mounting flange 230 such that the bolt insertion hole 630 is aligned with the bolt mounting hole 240 when the sensor target 600 is mounted to the wheel mounting flange 230. Accordingly, when the wheel is coupled to the wheel mounting flange 230 using the wheel mounting bolts 250, the sensor target 600 may also be mounted and fixed to the wheel mounting flange 230. With this configuration, it is possible to assemble the sensor target 600 to the wheel bearing 100 in a faster and easier manner without an additional mounting structure or an additional mounting process for mounting the sensor target 600.

According to one embodiment of the present disclosure, in the sensor target 600, the target portion 620 may be preferably formed to be positioned radially outward of the bolt insertion hole 630 such that the sensing member can be easily arranged in the vicinity of the target portion 620.

According to one embodiment of the present disclosure, at least one blank portion 650 having a penetrated structure may be provided between the target portion 620 and the bolt insertion hole 630 of the sensor target 600. By the blank portion 650, empty space may be formed at a position between the target portion 620 and the bolt insertion hole 630 in the radial direction.

According to one embodiment of the present disclosure, the bolt insertion hole 630 may be formed by protruded portions 640 formed to extend radially outwardly from a portion where the blank portion 650 is formed.

For example, the bolt insertion hole 630 may be formed by a pair of protruded portions 640 to extend in the radially outward direction, and the through-hole for the wheel mounting bolt 250 may be defined between the pair of protruded portions 640.

According to one embodiment of the present disclosure, a plurality of blank portions 650 may be provided to be spaced apart from each other along the circumferential direction. Each of the plurality of blank portions 650 may have a central blank 660 positioned between the target portion 620 and the bolt insertion hole 630 and at least one side blank 670 formed to extend from the central blank 660 in the circumferential direction.

According to one embodiment of the present disclosure, the blank portion 650 may be formed to be in communication with the bolt insertion hole 630. For example, the pair of protruded portions 640 forming the bolt insertion hole 630 may be arranged to have a structure in which a radially outer portion of the bolt insertion hole 630 is opened, and the center blank 660 and the bolt insertion hole 630 may be in communication with each other through the opening portion.

According to one embodiment of the present disclosure, the side blank 670 may be formed to have a relatively large radial gap as compared to the center blank 660. To do this, the side blank 670 may have an extended portion 672 whose radial gap becomes larger as it is more distant from the center blank 660 in the circumferential direction.

For example, as shown in the drawings, an area adjacent to the central blank 660 in the side blank 670 may be formed to have a structure in which the radial gap is increased by the outer peripheral surface of the protruded portions 640 of forming the bolt insertion hole 630.

As described above, since the sensor target 600 according to one embodiment of the present disclosure is configured to comprise the blank portion 650 having a penetrated structure between the target portion 620 (for example, penetrated windows) and the bolt insertion hole 630, it is possible to prevent the target portion 620 from being deformed due to stress caused by a fastening force of the wheel mounting bolt 250, which is generated when engaging the wheel mounting bolt 250 into the bolt insertion hole 630. This makes it possible to prevent a problem that the sensing accuracy of the rotational speed deteriorates due to the deformation of the target portion.

According to one embodiment of the present disclosure, the wheel mounting flange 230 on which the sensor target 600 is mounted may be provided with a recess 270 formed to be concave inwardly at a portion where the target portion 620 (for example, window) formed in the sensor target 600 is located when the sensor target 600 is mounted.

As such, when the recess 270 is formed at the position corresponding to the window, a change in magnetic field may occur by the recess 270 at a relatively great level as the sensor target 600 rotates. Thus, it is possible to more accurately measure the rotational speed of the wheel.

According to one embodiment of the present disclosure, the sensor target 600 may further comprise a cylindrical portion 680 formed to be bent and to extend in the axial direction from a radially inner end portion of the annular plate portion 610. The cylindrical portion 680 may be configured to entirely or partially cover a gap defined between a wheel-side end portion of the non-rotating element 300 of the wheel bearing 100 and the wheel mounting flange 230 from the radially outward direction. This makes it possible to further improve sealing property of the wheel bearing 100.

According to one embodiment of the present disclosure, the wheel mounting flange 230 may be provided with a stepped mounting portion 280. The cylindrical portion 680 of the sensor target 600 may be mounted on the stepped mounting portion 280.

According to one embodiment of the present disclosure, the annular plate portion 610 of the sensor target 600 may further comprise a bent end portion 690 formed to be bent in the axial direction from a radially outer portion of the annular plate portion 610. This configuration makes it possible to further suppress the deformation of the sensor target 600 while facilitating the mounting of the sensor target 600.

According to one embodiment of the present disclosure, a sensing member (not shown) may be provided in the vicinity of the target portion 620 formed in the annular plate portion 610 of the sensor target 600 to sense a change in magnetic field generated by the sensor target 600 and measure the rotational speed of the wheel. For example, the sensing member may be fixed to the vehicle body by being mounted on the outer ring 300, a chassis member connected to the outer ring 300, or the like.

The present disclosure is not characterized in a specific structure of the sensing member. The sensing member and a mounting structure thereof may be implemented similar to those in the conventional wheel bearing. Accordingly, detailed description thereof will be omitted herein.

Figure 7:
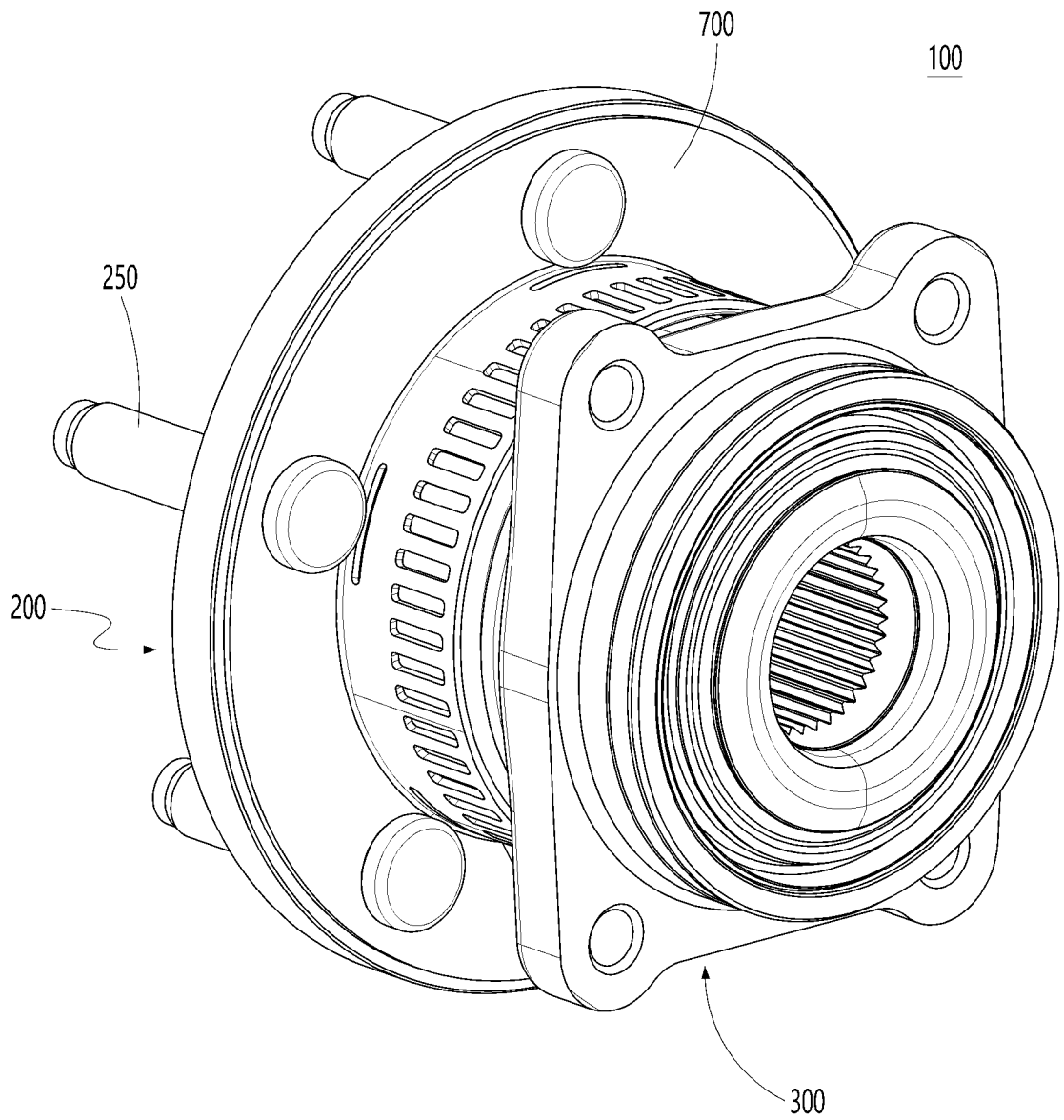
FIG. 7 exemplarily illustrates a wheel bearing according to another embodiment of the present disclosure.
Figure 8:
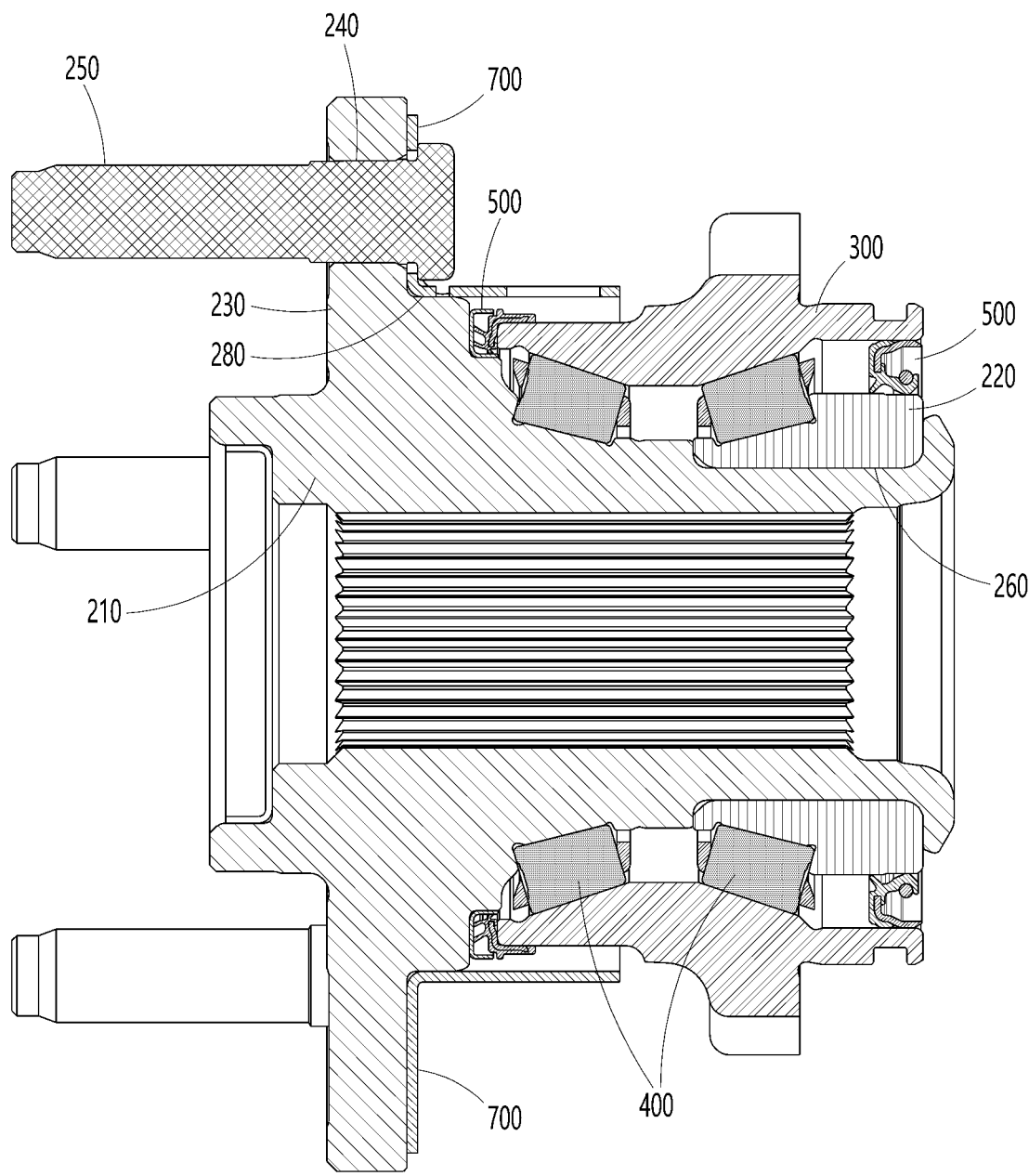
FIG. 8 exemplarily illustrates a cross-sectional structure of the wheel bearing shown in FIG. 7.
Figure 9:
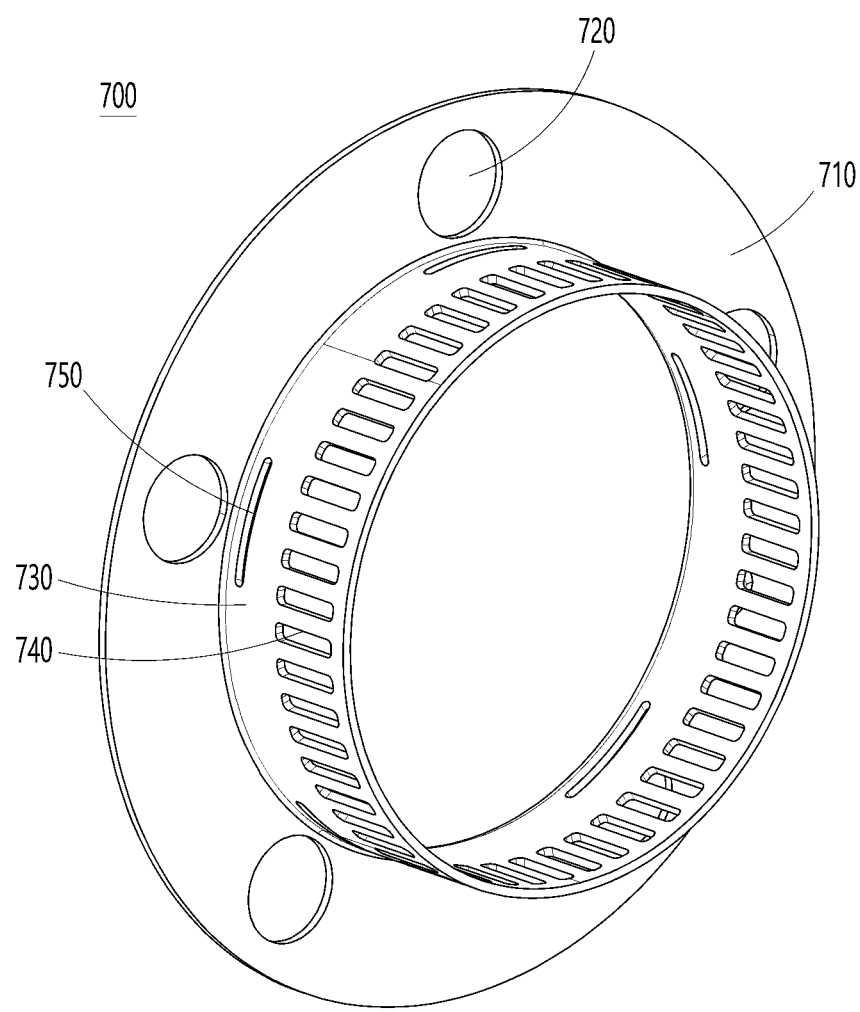
FIG. 9 exemplarily illustrates a structure of a sensor target mounted to the wheel bearing so as to measure a rotational speed of a wheel in the wheel bearing shown in FIG. 7.

Referring to FIGS. 7 to 9, a sensor target according to another embodiment of the present disclosure and a wheel bearing comprising the same are exemplarily shown. The sensor target and the wheel bearing comprising the same according to the embodiment shown in FIGS. 7 to 9 may be similar to the above-described embodiment in the overall configuration, but there is a difference in the sensor target and the mounting structure thereof between these embodiments. Hereafter, such a difference will be briefly described.

A sensor target 700 according to the embodiment shown in FIGS. 7 to 9 may be configured to be mounted and fixed to one axial end surface (for example, vehicle-body-side end surface) of the wheel mounting flange 230, similar to the sensor target 600 of the above-described embodiment.

Specifically, the sensor target 700 according to this embodiment may comprise an annular plate portion 710 to be coupled to the wheel mounting flange 230, and a cylindrical portion 730 formed to be bent and to extend in the axial direction from a radially inner end portion of the annular plate portion 710.

According to one embodiment of the present disclosure, the annular plate portion 710 may be formed in a thin plate shape having a penetrated central portion. A plurality of bolt insertion holes 720, into which the wheel mounting bolt 250 is inserted, may be formed in the annular plate portion 710 at intervals in the circumferential direction.

According to one embodiment of the present disclosure, the cylindrical portion 730 may be formed to have a generally cylindrical structure whose central portion is empty. A target portion 740 used to measure the rotational speed of the wheel may be formed on one side of the cylindrical portion 730. According to one embodiment of the present disclosure, the target portion 740 may be formed to have a configuration in which a plurality of penetrated windows are arranged at equal intervals along the circumferential direction.

In this configuration, when the sensor target 700 according to the present embodiment rotates together with the wheel, a change in magnetic field or the like occurs by the target portion 740 similar to the above-described embodiment. By sensing such a change in magnetic field using a sensing member (not shown), it is possible to measure the rotational speed of the wheel.

According to one embodiment of the present disclosure, at least one blank portion 750 having a penetrated structure may be provided between the bolt insertion hole 720 formed in the annular plate portion 710 and the target portion 740 (for example, window) formed in the cylindrical portion 730.

According to one embodiment of the present disclosure, the blank portion 750 may be formed in the annular plate portion 710 positioned radially inward of the bolt insertion hole 720 or the cylindrical portion 730 positioned closer to the circular plate portion 710 than the target portion 740. That is, the blank portion 750 having an empty space may be positioned between the bolt insertion hole 720 and the target portions 740.

For example, in the embodiment shown in the drawings, the blank portion 750 may be formed in a portion of the cylindrical portion 730 positioned between the target portion 740 and the annular plate portion 710.

According to one embodiment of the present disclosure, the blank portion 750 may be formed to extend along the circumferential direction (for example, in a slit shape extending along the circumferential direction as shown in the drawings). Further, a plurality of blank portions 750 may be formed at intervals along the circumferential direction.

According to one embodiment of the present disclosure, the blank portion 750 may be formed to have a longer length than the bolt insertion hole 720 in the circumferential direction such that stress, which is caused by a fastening force of the wheel mounting bolt 250 when engaging the wheel mounting bolt 250 into the bolt insertion hole 720, can be prevented from being transmitted to the target portions 740.

According to one embodiment of the present disclosure, the wheel mounting flange 230 may be provided with a stepped mounting portion 280 similar to the above-described embodiment. The cylindrical portion 730 of the sensor target 700 may be mounted on the stepped mounting portion 280. The cylindrical portion 730 of the sensor target 700 (specifically, a portion of the cylindrical portion 730 in which the target portion 740 is formed) may be configured to face the outer peripheral surface of the non-rotating element 300 at a position spaced in the radial direction from the outer peripheral surface of the non-rotating element 300 provided in the wheel bearing 100.

Figure 10:
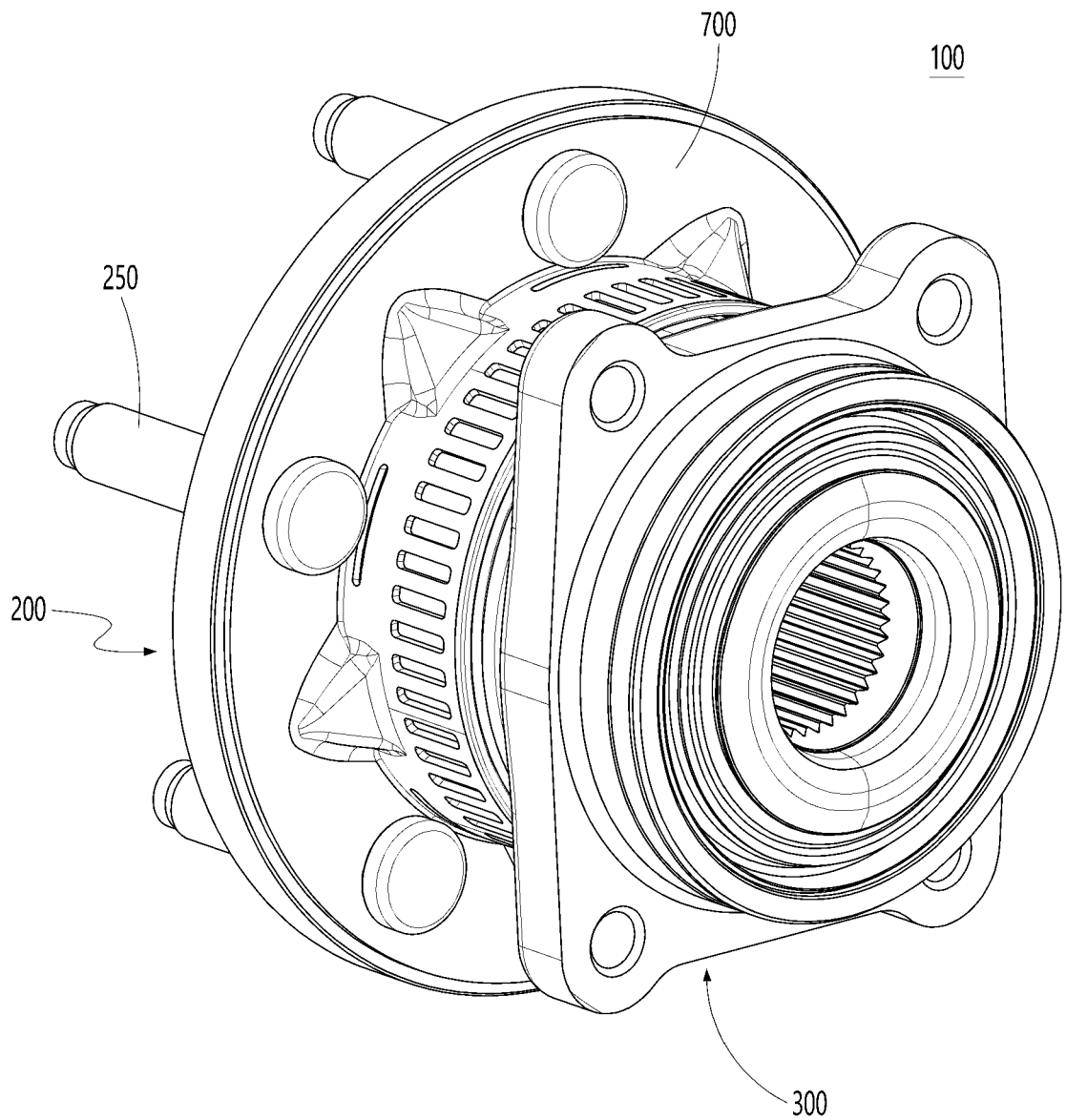
FIG. 10 exemplarily illustrates a wheel bearing according to still another embodiment of the present disclosure.
Figure 11:
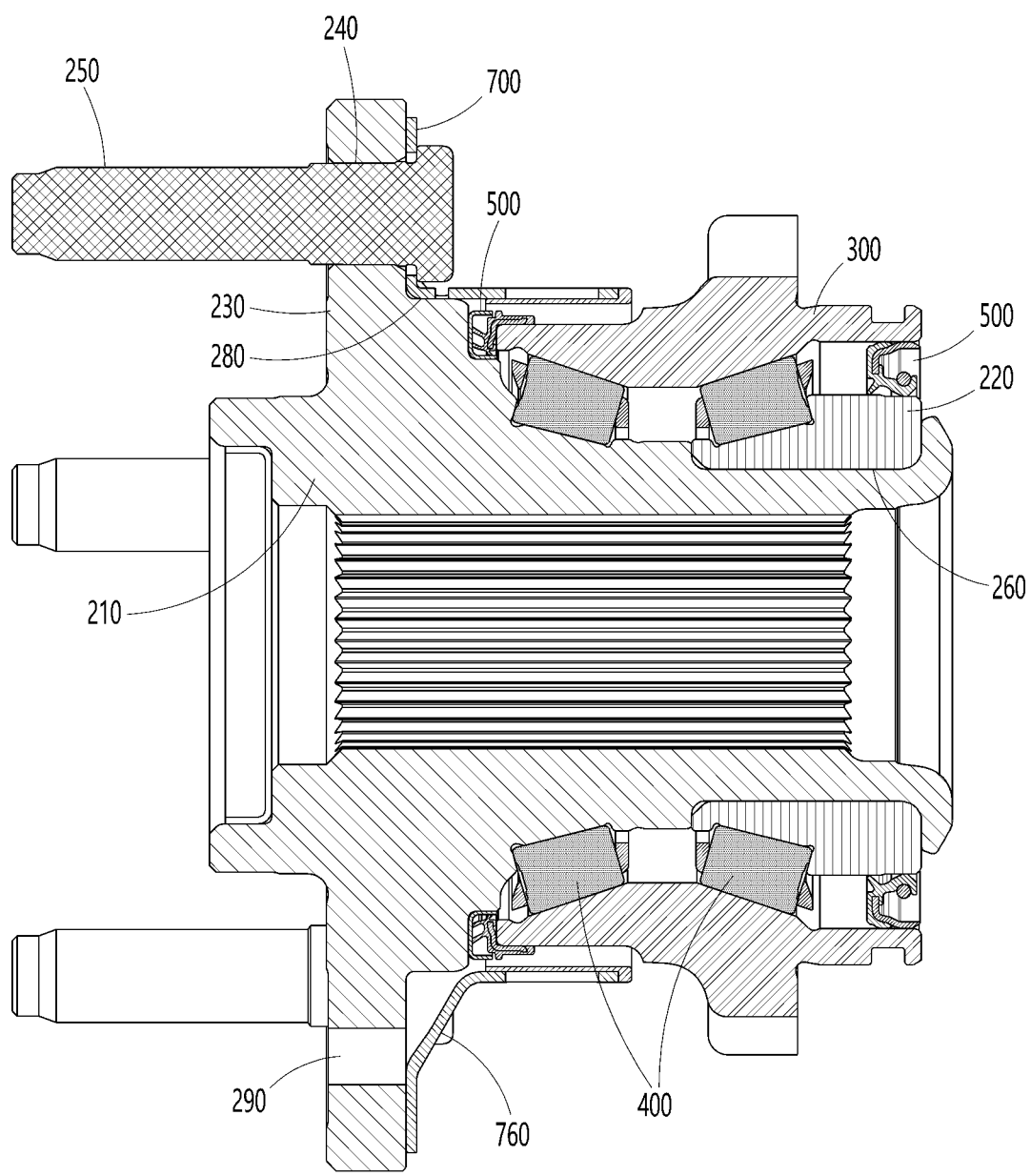
FIG. 11 exemplarily illustrates a cross-sectional structure of the wheel bearing shown in FIG. 10.
Figure 12:
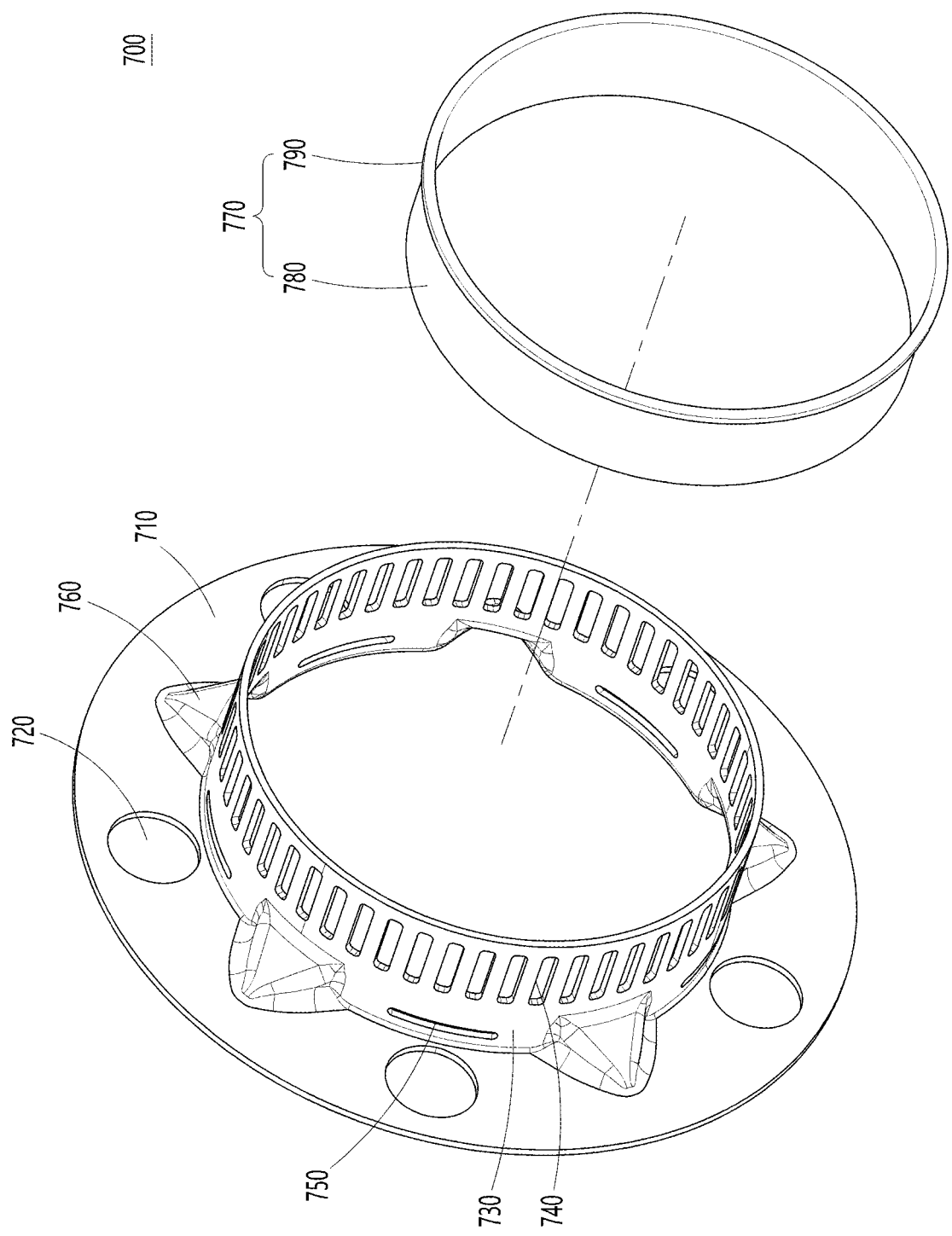
FIG. 12 exemplarily illustrates a structure of a sensor target mounted to the wheel bearing so as to measure a rotational speed of a wheel in the wheel bearing shown in FIG. 10.

Referring to FIGS. 10 to 12, a sensor target according to yet another embodiment of the present disclosure and a wheel bearing comprise the same are exemplarily shown.

The sensor target and the wheel bearing comprising the same shown in FIGS. 10 to 12 are similar to those of the embodiment shown in FIGS. 7 to 9 in the overall configuration except that the sensor target 700 is further provided with at least one baffle portion 760 and a coupling member 770 to be described below.

As shown in FIGS. 10 to 12, the sensor target 700 that is applicable to the wheel bearing 100 according to one embodiment of the present disclosure may comprise the baffle portion 760 formed to be radially bent at a connection portion between the annular plate portion 710 and the cylindrical portion 730 to enhance rigidity of the sensor target 700.

According to one embodiment of the present disclosure, the baffle portion 760 may be formed throughout in the circumferential direction between the annular plate portion 710 and the cylindrical portion 730. Alternatively, one or more baffle portions 760 may be provided along the circumferential direction, as shown in the drawings.

According to one embodiment of the present disclosure, the baffle portion 760 may be formed to be bent outward in the radial direction such that a radially inner portion of the cylindrical portion 730 is in communication with a drain hole 290 formed in the wheel mounting flange 230.

With this configuration, moisture introduced inward of the sensor target 700 in the radial direction can be discharged outward through the baffle portion 760 and the drain hole 290, which makes it possible to further implement performance improvement and lifespan extension of the sensor target 700 and the wheel bearing 100 comprising the same.

According to one embodiment of the present disclosure, as shown in FIGS. 10 to 12, the cylindrical portion 730 of the sensor target 700 may be configured to comprise a coupling member 770 coupled to an axial end portion thereof.

According to one embodiment of the present disclosure, the coupling member 770 may comprise a cylindrical coupling portion 780 formed to extend in the axial direction and a coupling end portion 790 formed on one end of the cylindrical coupling portion 780. The cylindrical coupling portion 780 may be inserted into and coupled to the cylindrical portion 730 of the sensor target 700.

For example, the cylindrical coupling portion 780 of the coupling member 770 may have an outer diameter corresponding to an inner diameter of the cylindrical portion 730 of the sensor target 700. The cylindrical coupling portion 780 may be configured to cover the window-shaped target portion 740 formed in the cylindrical portion 730 from the radially inward direction.

As described above, by coupling the coupling member 770 to the cylindrical portion 730 of the sensor target 700, it is possible to protect the sensor target 700 from colliding with foreign substances entering from a road surface, thus implementing lifespan extension and performance improvement of the sensor target 700.

According to one embodiment of the present disclosure, although not shown in the drawings, the coupling member 770 may be inserted into the penetrated window forming the target portion 740 to partially or entirely fill the internal space of the penetrated window. For example, the outer peripheral surface of the cylindrical coupling portion 780 may have at least one filling portion formed to protrude outwardly in the radial direction so as to be inserted into the penetrated window.

According to one embodiment of the present disclosure, the coupling member 770 may be formed of a material, such as plastic or the like. The coupling member 770 may be formed by inject-molding the plastic material in one end portion of the sensor target 700.

While the present disclosure has been described above by way of particular features such as specific components and the like, and exemplary embodiments, these embodiments are provided to further facilitate overall understanding of the present disclosure, and the present disclosure is not limited thereto. Various modifications and variations may be made from the above descriptions by those skilled in the art.

In the above-described embodiments, for example, the wheel bearing has been described to have a so-called third-generation wheel bearing structure in which one inner ring is mounted to the wheel hub in a press-fitting manner. However, the wheel bearing according to the present disclosure may have another structure, such as a so-called 2.5-generation wheel bearing structure in which two inner rings are mounted to a wheel hub, a so-called second-generation wheel bearing structure in which a wheel hub functions as an outer member, or the like.

Further, in the above-described embodiments, the wheel bearing has been described with the embodiment in which the rotational speed of the wheel is measured using the sensor target including the penetrated window. However, the sensor target may be formed to have a toothed structure instead of the penetrated window, a structure including an encoder, or the like.

Accordingly, the spirit of the present disclosure should not be limited to the above-described embodiments, and not only the append claims but also all those modified equally or equivalently to the claims are intended to fall within the scope of the spirit of the present disclosure.

EXPLANATION OF REFERENCE NUMERALS

100: wheel bearing
200: rotating element
210: wheel hub
220: inner ring
230: wheel mounting flange
240: bolt mounting hole
250: wheel mounting bolt
260: stepped portion
270: recess
280: mounting portion
290: drain hole
300: non-rotating element
310: vehicle-body-side mounting flange
320: fastening hole
400: rolling element
500: sealing member
600: sensor target
610: annular portion
620: target portion
630: bolt insertion hole
640: protruded portion
650: blank portion
660: central blank
670: side blank
680: cylindrical portion
690: bent end portion
700: sensor target
710: annular plate portion
720: bolt insertion hole
730: cylindrical portion
740: target portion
750: blank portion
760: baffle portion
770: coupling member
780: cylinder coupling portion
790: coupling end portion

What is claimed is:

1. A wheel bearing that supports a wheel of a vehicle relative to a vehicle body while rotatably mounting the wheel to the vehicle body, comprising:
   a rotating element to which the wheel of the vehicle is mounted and configured to rotate together with the wheel of the vehicle;
   a non-rotating element fixed to the vehicle body; and
   one or more rolling elements provided between the rotating element and the non-rotating element and configured to rotatably support the rotating element relative to the non-rotating element, wherein
   the rotating element comprises a wheel mounting flange on which the wheel of the vehicle is mounted,
   a sensor target used to measure a rotational speed of the wheel is provided on an axial end surface of the wheel mounting flange,
   the sensor target comprises an annular plate portion configured to be mounted to the axial end surface of the wheel mounting flange,
   the annular plate portion comprises a target portion used for measuring the rotational speed of the wheel and at least one bolt insertion hole into which a wheel mounting bolt is inserted, and
   at least one blank portion having a penetrated structure is provided between the target portion and the bolt insertion hole in a radial direction.

2. The wheel bearing of claim 1, wherein the blank portion is configured to be in communication with the bolt insertion hole.

3. The wheel bearing of claim 2, wherein the blank portion comprises:
   a central blank positioned outside the bolt insertion hole in the radial direction; and
   at least one side blank formed to extend in a circumferential direction from the central blank.

4. The wheel bearing of claim 3, wherein the bolt insertion hole is configured to be in communication with the central blank of the blank portion.

5. The wheel bearing of claim 4, wherein the side blank has an extended portion whose radial gap becomes larger as it is more distant from the central blank in the circumferential direction.

6. The wheel bearing of claim 4, wherein the sensor target further comprises a cylindrical portion formed to extend along an axial direction from a radially inner end portion of the annular plate portion.

7. The wheel bearing of claim 6, wherein the cylindrical portion of the sensor target is configured to entirely or partially cover an axial gap defined between the wheel mounting flange and the non-rotating element of the wheel bearing from a radially outward direction.

8. The wheel bearing of claim 6, wherein the target portion comprises a plurality of penetrated windows provided at equal intervals along the circumferential direction.

9. The wheel bearing of claim 1, wherein the rotating element of the wheel bearing comprises a wheel hub to which the wheel is mounted; and at least one inner ring mounted to the wheel hub in a press-fitting manner, the non-rotating element of the wheel bearing is an outer ring coupled to a chassis component of the vehicle, and the wheel mounting flange is provided in the wheel hub.

10. A wheel bearing that supports a wheel of a vehicle relative to a vehicle body while rotatably mounting the wheel to the vehicle body, comprising:
    a rotating element to which the wheel of the vehicle is mounted and configured to rotate together with the wheel of the vehicle;
    a non-rotating element fixed to the vehicle body; and
    one or more rolling elements provided between the rotating element and the non-rotating element and configured to rotatably support the rotating element relative to the non-rotating element, wherein
    the rotating element comprises a wheel mounting flange on which the wheel of the vehicle is mounted,
    a sensor target used to measure a rotational speed of the wheel is provided on an axial end surface of the wheel mounting flange,
    the sensor target comprises an annular plate portion configured to be mounted to the axial end surface of the wheel mounting flange; and a cylindrical portion formed to extend along an axial direction from a radially inner end portion of the annular plate portion,
    wherein the annular plate portion of the sensor target comprises at least one bolt insertion hole into which a wheel mounting bolt is inserted,
    the cylindrical portion of the sensor target comprises a target portion used for measuring the rotational speed of the wheel, and
    at least one blank portion having a penetrated structure is provided between the bolt insertion hole and the target portion.

11. The wheel bearing of claim 10, wherein the blank portion is provided in the cylindrical portion of the sensor target.

12. The wheel bearing of claim 11, wherein at least one baffle portion formed to be bent outward in a radial direction is provided in a connection portion between the annular plate portion and the cylindrical portion of the sensor target.

13. The wheel bearing of claim 12, wherein a radially inner portion of the sensor target and a drain hole formed in the wheel mounting flange are in communication with each other through the baffle portion.

14. The wheel bearing of claim 13, wherein the target portion comprises a plurality of penetrated windows provided to be spaced at equal intervals along a circumferential direction.

15. The wheel bearing of claim 14, further comprising a coupling member to be coupled to the cylindrical portion of the sensor target,
    wherein the coupling member is configured to cover a radially inner portion of the window provided in the target portion.

16. The wheel bearing of claim 15, wherein the coupling member is configured to entirely or partially fill the window provided in the target portion by being inserted into the window.

* * * * *